United States Patent
Choi

(10) Patent No.: US 11,821,499 B2
(45) Date of Patent: Nov. 21, 2023

(54) POWER TRANSMISSION DEVICE

(71) Applicant: HJ TRANSMISSION Co., Ltd., Ansan-si (KR)

(72) Inventor: Hyeong Jin Choi, Ansan-si (KR)

(73) Assignee: HJ TRANSMISSION CO., LTD.

( * ) Notice: Subject to any disclaimer, the term of this patent is extended or adjusted under 35 U.S.C. 154(b) by 0 days.

(21) Appl. No.: 17/507,910

(22) Filed: Oct. 22, 2021

(65) Prior Publication Data
US 2022/0042577 A1 Feb. 10, 2022

Related U.S. Application Data

(63) Continuation of application No. PCT/KR2020/004317, filed on Mar. 30, 2020.

(30) Foreign Application Priority Data

Apr. 23, 2019 (KR) .................. 10-2019-0047102

(51) Int. Cl.
*F16H 3/085* (2006.01)
*F16D 11/00* (2006.01)
*F16H 3/093* (2006.01)

(52) U.S. Cl.
CPC .............. *F16H 3/085* (2013.01); *F16D 11/00* (2013.01); *F16D 2011/006* (2013.01);
(Continued)

(58) Field of Classification Search
CPC ............. F16H 3/085; F16H 2003/0938; F16H 2200/0043; F16H 2200/0052;
(Continued)

(56) References Cited

U.S. PATENT DOCUMENTS

2007/0240531 A1 10/2007 Endo et al.

FOREIGN PATENT DOCUMENTS

| JP | 11230278 A | | 8/1999 |
|---|---|---|---|
| JP | 2002165515 A | * | 6/2002 |
| JP | 2002165515 A | | 6/2002 |
| JP | 2011252558 A | * | 12/2011 |

(Continued)

OTHER PUBLICATIONS

English Translation of PCT/ISA/237 for PCT/KR2020/004317, Oct. 26, 2021 (Year: 2021).*

(Continued)

*Primary Examiner* — Victor L MacArthur
(74) *Attorney, Agent, or Firm* — Park & Associates IP Law Office

(57) ABSTRACT

A power transmission device is provided to provide a 6 forward and 1 reverse transmission capable of smoothly performing 6 forward and 1 reverse or 4 forward and 1 reverse shifting. The power transmission device includes: a first shift input unit in which a reverse clutch and a first shift high clutch are provided at both ends and a first shift low gear is installed to be constrained by a first shift one-way gearing in one direction so that a driving force from a power input unit is transmitted thereto; a firs shift output unit to which a driving force from the first shift input unit is transmitted; a reverse input gear unit to which a reverse driving force from the first shift input unit is transmitted; a second shift input unit in which a second shift middle clutch is provided at one side end and a second shift low gear is installed to be constrained by a second shift one-way bearing in one direction so that a driving force from the first shift output unit is transmitted thereto; a forward idle gear unit connected to and installed at the first shift output unit and the second shift input unit to transmit a driving force from the first shift output unit to the second shift input unit; and a second shift output unit installed so that a reverse driving (Continued)

force by the reverse input gear unit and a forward driving force by the second shift input unit are transmitted thereto.

13 Claims, 7 Drawing Sheets

(52) U.S. Cl.
CPC ............... *F16H 2003/0938* (2013.01); *F16H 2200/0043* (2013.01); *F16H 2200/0052* (2013.01)

(58) Field of Classification Search
CPC .... F16H 2003/0818; F16H 3/10; F16H 3/093; F16H 3/006; F16H 2003/0822; F16H 2003/0826; F16D 11/00; F16D 2011/006
USPC ......... 74/331, 333, 360, 359, 340, 664, 368, 74/665 R, 665 P
See application file for complete search history.

(56) References Cited

FOREIGN PATENT DOCUMENTS

| | | | |
|---|---|---|---|
| JP | 2011252558 | A | 12/2011 |
| KR | 1019980082646 | A | 12/1998 |
| KR | 100354519 | B1 | 9/2002 |
| KR | 100578762 | B1 | 5/2006 |
| KR | 1020090009545 | A | 1/2009 |
| KR | 1020120108627 | A | 10/2012 |
| KR | 20190001289 | A * | 1/2019 |
| KR | 1020190001289 | A | 1/2019 |
| KR | 102017774 | B1 | 9/2019 |

OTHER PUBLICATIONS

Korean Notice of Allowance (KR 10-2019-0047102), KIPO, dated Aug. 12, 2019.
International Search Report (PCT/KR2020/004317), WIPO, dated Jul. 3, 2020.

* cited by examiner

POWER TRANSMISSION DEVICE

REFERENCE TO RELATED APPLICATIONS

This is a continuation of International Patent Application PCT/KR2020/004317 filed on Mar. 30, 2020, which designates the United States and claims priority of Korean Patent Application No. 10-2019-0047102 filed on Apr. 23, 2019, the entire contents of which are incorporated herein by reference.

FIELD OF THE INVENTION

The present disclosure relates to a power transmission device, and more particularly, to a power transmission device having a simple structure and capable of changing speeds to 4 forward speeds and 1 reverse speed or to 6 forward speeds and 1 reverse speed by connecting a rear clutch and two or three clutches.

BACKGROUND OF THE INVENTION

In general, a transmission serves to increase or decrease a rotational force from an engine according to a change in a driving state of a moving unit between an input shaft connected to an engine through a clutch and an output shaft connected to a driving wheel, and a gear-type transmission in which a pair of gear devices, among a plurality of pairs of gear devices disposed on both shafts, is selectively engaged to form a driving transmission state is widely known.

The gear-type transmission includes a planetary gear set that varies input power of the engine to an appropriate rotational force and outputs the same and a fastening element such as a clutch or brake that fixes or prevents rotation of each rotating element of the planetary gear set or rotates the same by power of the engine. As the gear-type transmission, devices that implement 4 or 5 gears are mainstream, but recently, devices capable of implementing 6 or more gears have been developed.

Conventionally used 4-speed, 5-speed, and 6-speed transmissions are individually designed and assembled to match the desired number of speeds, that is, each structure is designed and assembled in a different state, and thus, most operating elements are also different, so there was a problem in that a new mechanism such as the development and control of the clutch and brake needs to be developed.

In particular, the conventionally used 6-speed (6 forward, 1 reverse) transmission has a complicated structure and is mostly configured as a 2-shaft transmission, so that an overall length thereof increases excessively. Due to this, in a front-wheel drive type transportation means in which a space of an engine compartment is narrow, installation design standards for various devices and accessories are very strict, so it is very difficult to apply.

In addition, a 3-shaft 6-speed transmission has been developed to improve the problems with the 2-shaft 6-speed transmission, but in the conventional 3-shaft 6-speed transmission, all drive gears are directly connected to an input shaft, so that both a driving gear and a driven gear are rotated when the input shaft is rotated, which increases noise due to the rotation of the gears engaged with each other and there are many problems such as the need to install many idling gears.

SUMMARY OF THE INVENTION

An aspect of the present disclosure provides a power transmission device having a simple structure and capable of shifting from 4 forward speeds and 1 reverse speed to 6 forward speeds and 1 reverse speed by additionally installing parts.

Another aspect of the present disclosure provides a power transmission device in which a separate reverse clutch for reverse shift is installed and a reverse output is directly connected from an input shaft to an output shaft, thereby shortening a power transmission path during reverse shift to save energy and improve reverse performance.

Another aspect of the present disclosure provides a power transmission device for reducing operating noise and shock during a shift and shortening a longitudinal length of a transmission, thereby reducing an overall volume to improve space utilization of an engine compartment.

According to an aspect of the present disclosure, there is provided a power transmission device including: a first shift input unit in which a first shift low gear is connected to and installed at a first shift input shaft so as to be constrained by a first shift one-way bearing in one direction, a first shift input gear receiving a driving force from a power generating unit is integrally installed at the first shift input shaft, and a reverse clutch for clutching a first shift reverse gear to the first shift input shaft and a first shift high clutch for clutching a first shift high gear to the first shift input shaft are connected to and installed at both ends of the first shift input shaft; a first shift output unit connected and installed so that a driving force from the first shift low gear or the first shift high gear of the first shift input unit is transmitted thereto; a reverse input gear unit connected and installed so that a reverse driving force from the first shift reverse gear of the first shift input unit is transmitted thereto; a second shift input unit in which a second shift input gear receiving a driving force from the first shift output unit is integrally installed at the second shift input shaft, a second shift low gear is connected to the second shift input shaft so as to be constrained by a second shift one-way bearing in one direction, and a second shift middle clutch clutching a second shift middle gear to the second shift input shaft is connected to one end of the second shift input shaft; a forward idle gear unit connected to and installed at the first shift output unit and the second shift input unit so that a driving force from the first shift output unit is transmitted to the second shift input unit; and a second shift output unit connected and installed so that a reverse driving force by the reverse input gear unit and a forward driving force by the second shift input unit are transmitted thereto, to perform a forward or reverse output, wherein shifting of four (4) forward speeds is selectively performed according to whether the first shift high clutch and the second shift middle clutch perform clutching, and shifting of one (1) reverse speed is performed according to an operation of the reverse clutch.

In addition, in the present disclosure, a second shift high clutch operated to clutch the second shift high gear to the second shift input shaft may be further installed at the other end of the second shift input shaft of the second shift input unit and a second shift high output gear mashed with the second shift high gear is installed at the second shift output shaft of the second shift output unit so as to be integrally rotated, so that 6 forward shift is performed according to whether the first shift high clutch, the second shift middle clutch, and the second shift high clutch perform clutching and 1 reverse shift is performed according to an operation of the reverse clutch.

The present disclosure has a simple structure, and 4 forward and 1 reverse shift may be performed by a combination of a reverse clutch provided in a first shift input unit, a high clutch, and a middle clutch provided in a second shift input unit, and thus, an overall length of a transmission may be shortened, thereby reducing vibration and noise and improving space utilization of an engine compartment.

In the present disclosure, since first and second shift low gears are coupled to first and second shift input shafts by first and second shift one-way bearings, respectively, a shift is performed through idling of a low gear based on a rotation difference in a shift from a low stage to a high stage, and thus, gear shift may be smoothly performed even without a separate idling gear.

In the present disclosure, a reverse clutch for reversing is installed at the first shift input unit and a reverse driving force is directly transmitted from a first shift input shaft of the first shift input unit to a second shift output shaft of the second shift output unit by the reverse clutch, so that power for reversing may be quickly transmitted and reversing performance is improved.

In the present disclosure, by installing a second shift high gear operated by a second shift high clutch and a second shift high output gear engaged therewith, 6 forward and 1 reverse may be easily implemented by a combination of a reverse clutch, a first shift high clutch, a second shift middle clutch, and a second shift high clutch, even without a change in structural design.

In the present disclosure, since a second shift output gear is constrained to the second shift output shaft by an output one-way bearing, shift may be quickly performed without a waiting time of shift when shift gears according to an operation of the second shift middle clutch and the second shift high clutch in implementing 6 forward and 1 reverse, noise and impact due to shift may not occur, and the shift quality may be improved.

DETAILED DESCRIPTION OF THE INVENTION

Figure 1:
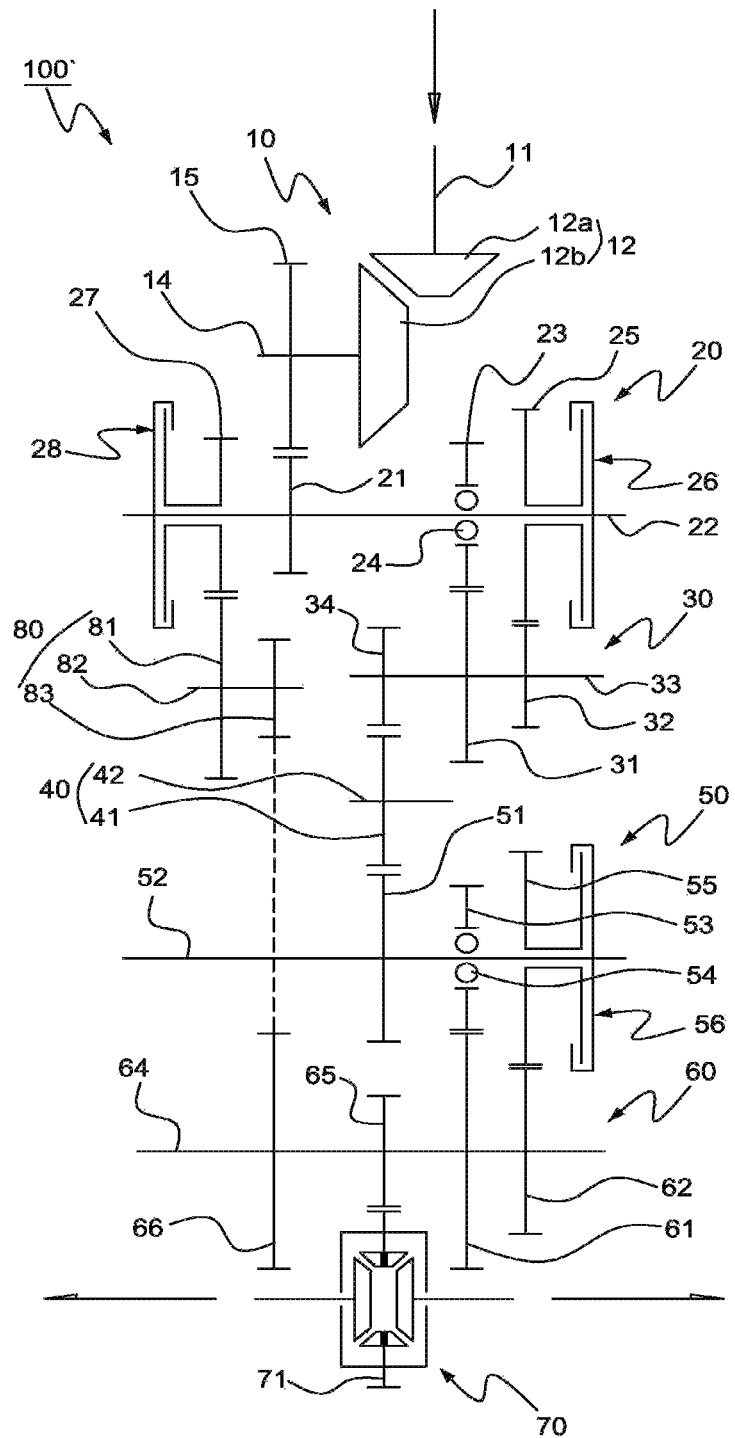
FIG. 1 is a schematic view illustrating a configuration according to the present disclosure.

FIG. 1 is a schematic view illustrating a configuration according to the present disclosure. A power transmission device according to the present disclosure includes a first shift input unit 20 in which a first shift low gear 23 is connected to and installed at a first shift input shaft 22 so as to be constrained by a first shift one-way bearing 24 in one direction, a first shift input gear 21 receiving a driving force from a power input unit 10 is integrally installed at the first shift input shaft 22, and a reverse clutch 28 for clutching a first shift reverse gear 27 to the first shift input shaft 22 and a first shift high clutch 26 for clutching a first shift high gear 25 to the first shift input shaft 22 are connected to and installed at both ends of the first shift input shaft 22; a first shift output unit 30 connected and installed so that a driving force from the first shift low gear 23 or the first shift high gear 25 of the first shift input unit 20 is transmitted thereto; a reverse input gear unit 80 connected and installed so that a reverse driving force from the first shift reverse gear 27 of the first shift input unit is transmitted thereto; a second shift input unit 50 in which a second shift input gear 51 receiving a driving force from the first shift output unit 30 is integrally installed at the second shift input shaft 52, a second shift low gear 53 is connected to the second shift input shaft 52 so as to be constrained by a second shift one-way bearing 54 in one direction, and a second shift middle clutch 56 clutching a second shift middle gear 55 to the second shift input shaft 52 is connected to one end of the second shift input shaft 52; a forward idle gear unit 40 connected to and installed at the first shift output unit 30 and the second shift input unit 50 so that a driving force from the first shift output unit 30 is transmitted to the second shift input unit 50; and a second shift output unit 60 connected and installed so that a reverse driving force by the reverse input gear unit 80 and a forward driving force by the second shift input unit 50 are transmitted thereto, to perform a forward or reverse output, wherein 4 forward shift is performed according to a clutch operation of the first shift high clutch 26 and the second shift middle clutch 56, and 1 reverse shift is performed according to an operation of the reverse clutch 28.

Here, the first and second shift low gears 23 and 53 are connected to and installed at the first and second shift input shafts 22 and 52 by the first and second shift one-way bearings 24 and 54, respectively, so that a rotational force from the first and second shift input shafts 22 and 52 are transmitted thereto when the power input unit 10 is driven in a forward direction.

Figure 2:
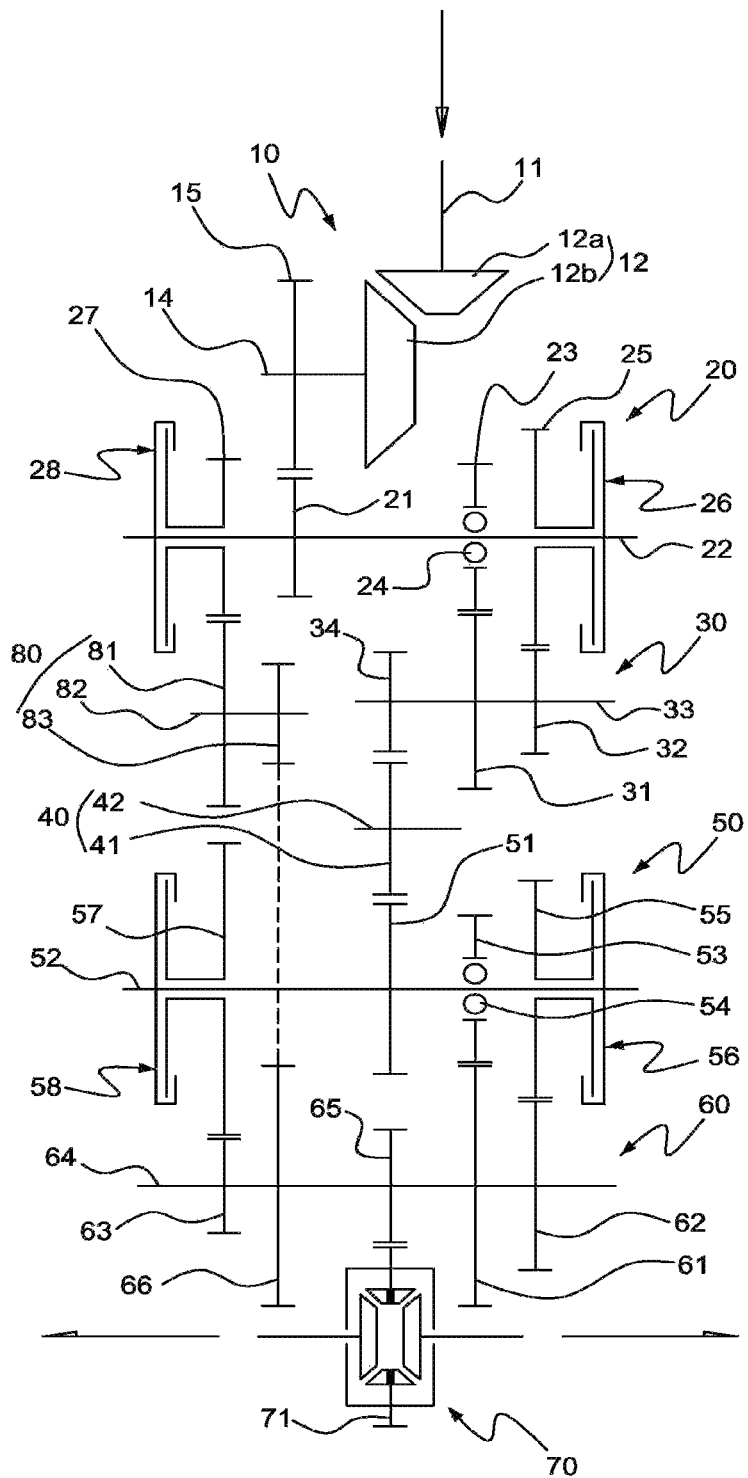
FIG. 2 is another schematic view illustrating a configuration according to the present disclosure.

In addition, in the present disclosure, as shown in FIG. 2, the second shift high clutch 58 operated so that the second shift high gear 57 is clutched to the second shift input shaft 52 may be further installed at the other end of the second shift input shaft 52 of the second shift input unit, and a second shift high output gear 63 engaged with the second shift high gear 57 is integrally rotationally installed at a second shift output shaft 64 of a second shift output unit, so that 6 forward shift is performed according to a clutch operation of the first shift high clutch 26, the second shift middle clutch 56, and the second shift high clutch 58 and 1 reverse shift is performed according to an operation of the reverse clutch 28.

That is, FIG. 2 shows another schematic diagram illustrating a configuration according to the present disclosure, a power transmission device according to the present disclosure includes a first shift input unit 20 in which a first shift low gear 23 is connected to and installed at a first shift input shaft 22 so as to be constrained by a first shift one-way bearing 24 in one direction, a first shift input gear 21 receiving a driving force from a power input unit 10 is integrally installed at the first shift input shaft 22, and a reverse clutch 28 for clutching a first shift reverse gear 27 to the first shift input shaft 22 and a first shift high clutch 26 for clutching a first shift high gear 25 to the first shift input shaft 22 are connected to and installed at both ends of the first shift input shaft 22; a first shift output unit 30 connected and installed so that a driving force from the first shift low gear 23 or the first shift high gear 25 of the first shift input unit 20 is transmitted thereto; a reverse input gear unit 80 connected and installed so that a reverse driving force from the first shift reverse gear 27 of the first shift input unit is transmitted thereto; a second shift input unit 50 in which a second shift input gear 51 receiving a driving force from the first shift output unit 30 is integrally installed at the second shift input shaft 52, a second shift low gear 53 is connected to the second shift input shaft 52 so as to be constrained by a second shift one-way bearing 54 in one direction, and the second shift middle clutch 56 clutching a second shift middle gear 55 to the second shift input shaft 52 and the second shift high clutch 58 clutching the second shift high gear 57 to the second shift input shaft 52 are connected to and installed at each of both ends of the second shift input shaft 52; a forward idle gear unit 40 connected to and installed at the first shift output unit 30 and the second shift input unit 50 so that a driving force from the first shift output unit 30 is transmitted to the second shift input unit 50; and a second shift output unit 60 in which a second shift low output gear 61 coupled to the second shift low gear 53, a second shift middle output gear 62 coupled to the second shift middle gear 55, a second shift high output gear 63 coupled to the second shift high gear 57, and a second shift reverse output gear 66 to which a reverse output gear 83 of a reverse gear input shaft 82 is coupled are connected to and installed at the second shift output shaft 64.

Hereinafter, the present disclosure will be described in detail in conjunction with the accompanying drawings.

Figure 3:
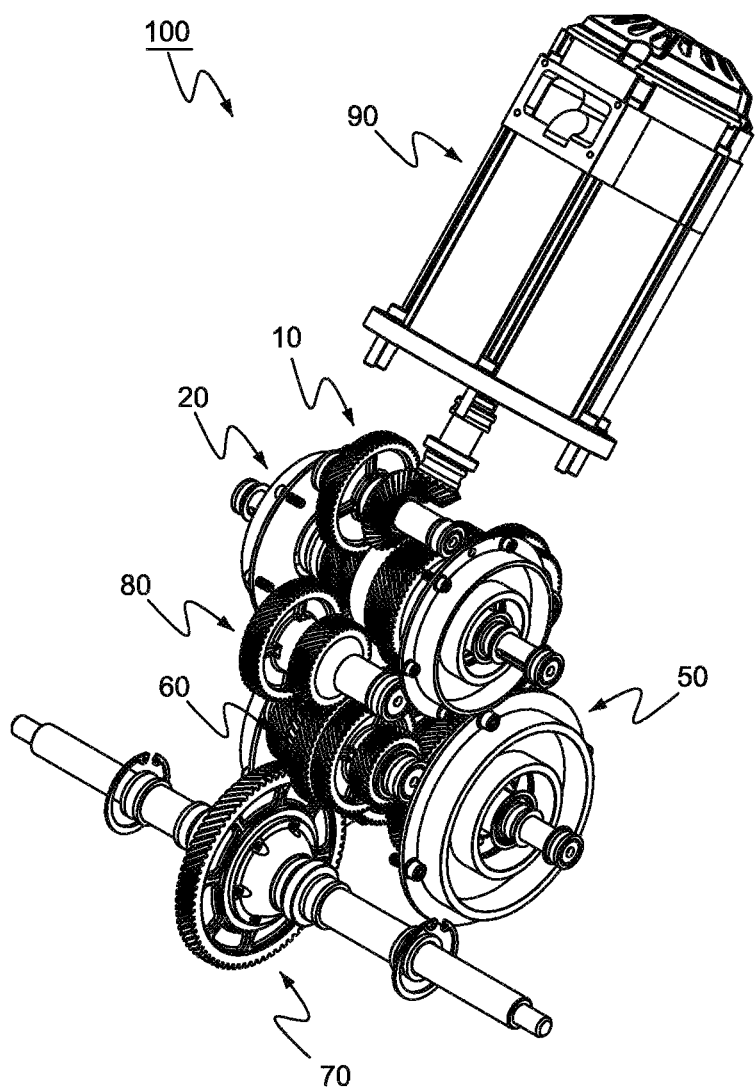
FIG. 3 is an exemplary view illustrating a configuration according to the present disclosure (6 forward and 1 reverse)
Figure 4:
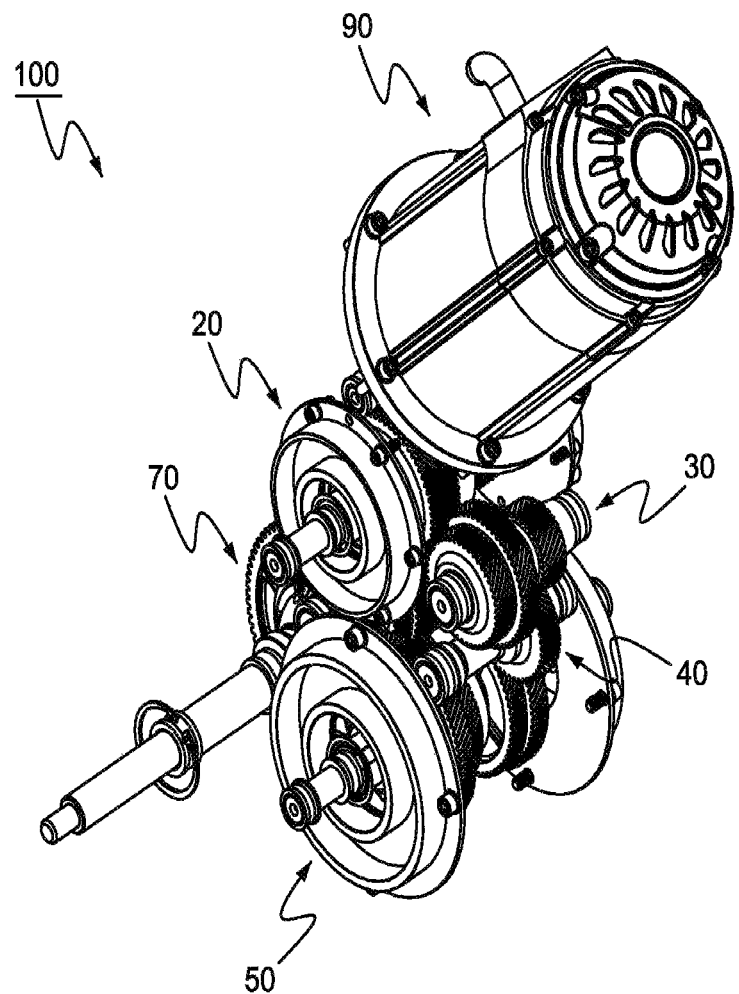
FIG. 4 is another exemplary view illustrating a configuration according to the present disclosure (6 forward and 1 reverse)
Figure 5:
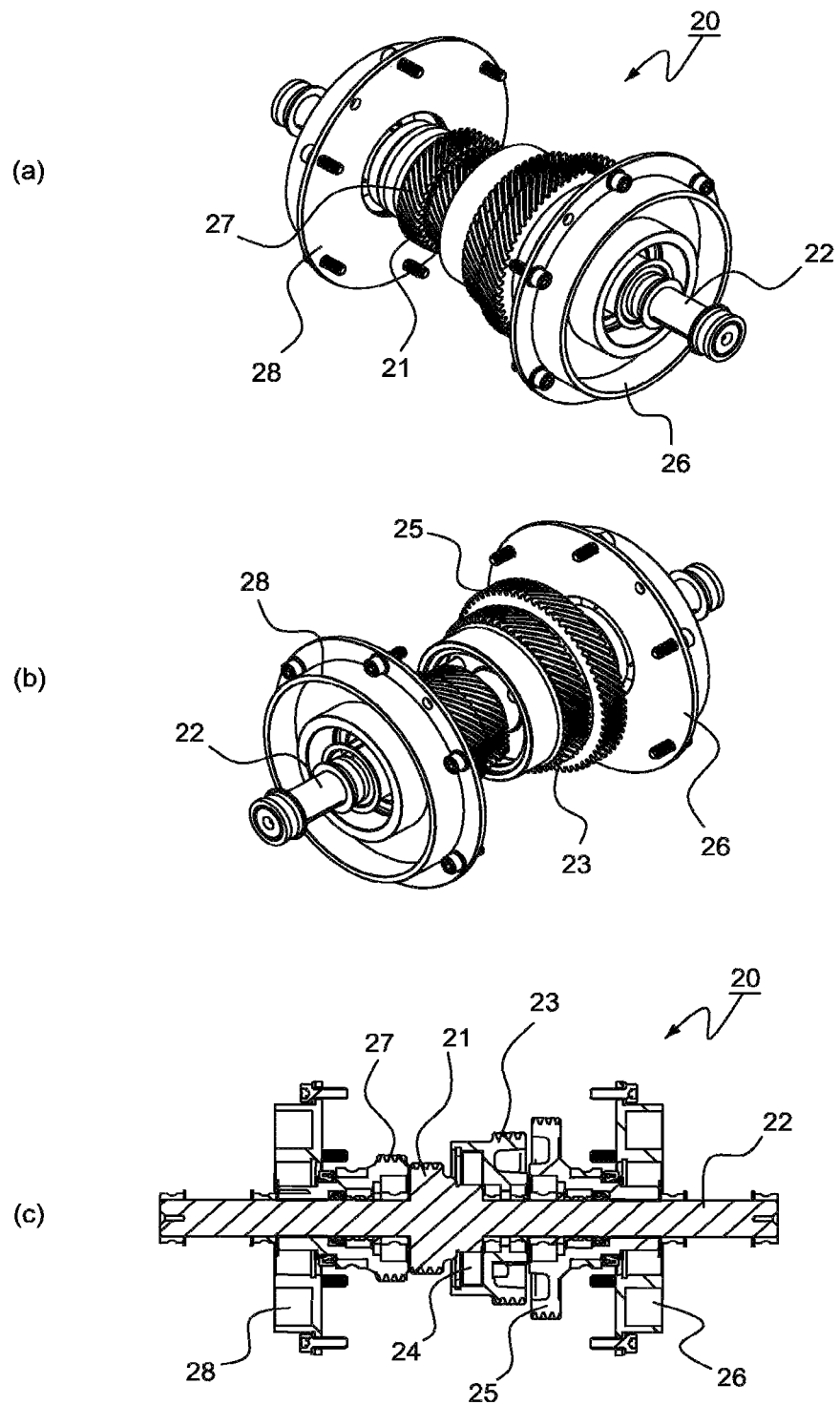
FIG. 5 is an exemplary view illustrating a configuration of a first shift input unit according to the present disclosure.
Figure 6:
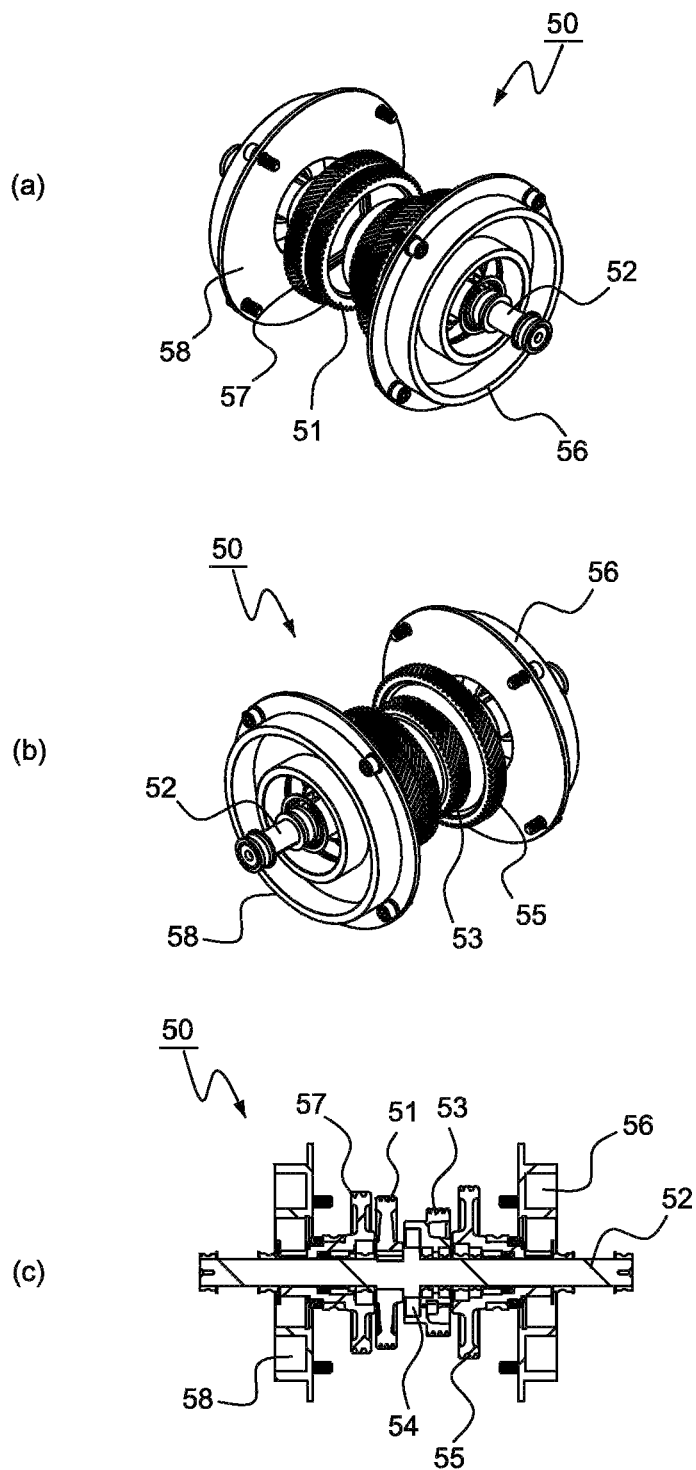
FIG. 6 is an exemplary view illustrating a configuration of a second shift input unit according to the present disclosure.
Figure 7:
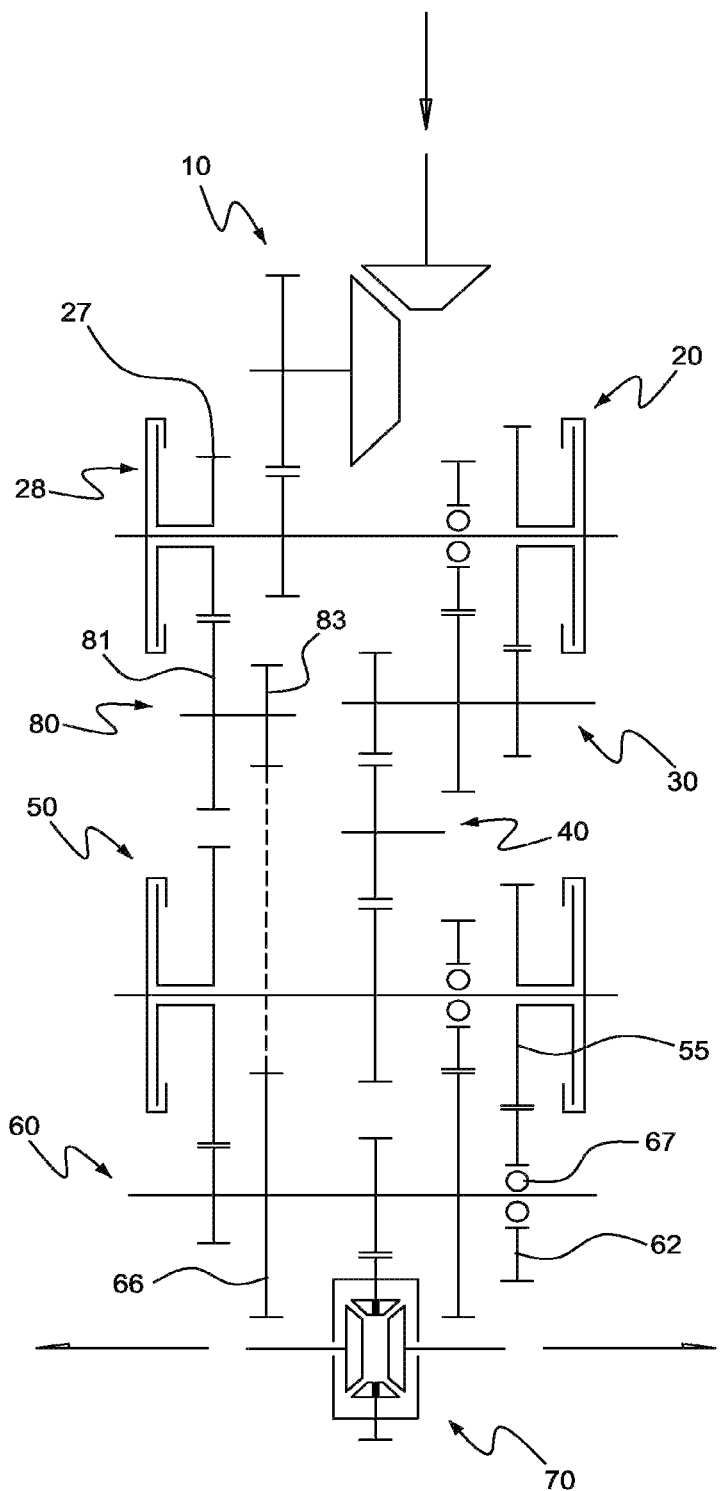
FIG. 7 is a schematic exemplary view illustrating an additional configuration according to the present disclosure (6 forward and 1 reverse).

FIG. 1 is a schematic view illustrating a configuration according to the present disclosure, FIG. 2 is another schematic view illustrating a configuration according to the present disclosure, FIG. 3 is an exemplary view illustrating a configuration according to the present disclosure (6 forward and 1 reverse), FIG. 4 is another exemplary view illustrating a configuration according to the present disclosure (6 forward and 1 reverse), FIG. 5 is an exemplary view illustrating a configuration of a first shift input unit according to the present disclosure, FIG. 6 is an exemplary view illustrating a configuration of a second shift input unit according to the present disclosure, and FIG. 7 is a schematic exemplary view illustrating an additional configuration according to the present disclosure (6 forward and 1 reverse).

The power input unit 10 receives external power and transmits the same to the first shift input unit 20. As shown in FIGS. 1 to 4, the power input unit 10 may include a power input shaft 11 receiving external power, a power output shaft 14 having an output gear 15, and a bevel gear 12 connected to and installed at the power input shaft 11 and the power output shaft 14 to transmit power.

Here, the bevel gear 12 includes an input bevel gear 12a connected to the power input shaft 11 and an output bevel gear 12b connected to the power output shaft 14.

In addition, the power input unit 10 may be configured such that external power generated from a power source 90 such as a driving motor or an engine is directly transmitted to the power output shaft 14 so that the output gear 15 is rotated.

As shown in FIGS. 1 to 5, the first shift input unit 20 includes a first shift input shaft 22, a first shift input gear 21 integrally rotated with the first shift input shaft 22 and engaged with the output gear 15 of the power input unit, a first shift low gear 23 installed at the first shift input shaft 22 and supported by a first shift one-way bearing 24, a reverse clutch 28 connected to and installed at one end of the first shift input shaft 22, a first shift reverse gear 27 installed to be integrally rotated with the first shift input shaft 22 by an operation of the reverse clutch 28, a first shift high clutch 26 connected to and installed at the other end of the first shift input shaft 22, and a first shift high gear 25 installed to be integrally rotated with the first shift input shaft 22 by an operation of the first shift high clutch 26.

That is, in the first shift input unit 20, the first shift input shaft 22 and the first shift input gear 21 are integrally connected, the first shift low gear 23 is connected to the first shift input shaft 22 via the first shift one-way bearing 24, the first shift reverse gear 27 is connected to and installed at the first shift input shaft 22 so as to be integrally rotated with the first shift input shaft 22 by the reverse clutch 28, and the first shift high gear 25 is connected to the first shift input shaft 22 so as to be integrally rotated with the first shift input shaft 22 by the first shift high clutch 26. Here, the first shift one-way bearing 24 is installed such that a rotation driving force from the first shift input shaft 22 is transmitted to the first shift low gear 23 so that the first shift input shaft 22 and the first shift low gear 23 are integrally rotated when the power input unit 10 is driven in a forward direction (forward driving). Here, the first shift low gear 23 is configured to have a fewer number of teeth than that of the first shift high gear 25.

In the first shift input unit 20 configured as described above, during a clutch release operation of the first shift high clutch 26 and the reverse clutch 28, a driving force (forward direction) of the power input unit 10 is transmitted to the first shift input shaft 22 through the first shift input gear 21 and the first shift low gear 23 is constrained (clutched) by the first shift one-way bearing 24 by a rotation of the first shift input shaft 22 so as to be integrally rotated with the first shift input shaft 22.

In addition, in the first shift input unit 20, when the first shift high clutch 26 is clutched, a rotational force from the first shift input shaft 22 is transmitted to the first shift low gear 23 and the first shift high gear 25.

In addition, in the first shift input unit 20, when the driving force (reverse direction) of the power input unit 10 is transmitted to the first shift input shaft 22 through the first shift input gear 21, the reverse clutch 28 is clutched and a rotational force from the first shift input shaft 22 is transmitted to the first shift reverse gear 27 by the clutch operation of the reverse clutch 28.

The first shift output unit 30 receives a driving force from the power input unit 10 by the first shift low gear 23 or the first shift high gear 25 of the first shift input unit, and transmits the received driving force to the forward idle gear unit 40.

As shown in FIGS. 1 to 3, the first shift output unit 30 includes a first shift output shaft 33, a first shift low output gear 31 integrally rotated with the first shift output shaft 33 and engaged with the first shift low gear 23, a first shift high output gear 32 integrally rotated with the first shift output shaft 33 and engaged with the first shift high gear 25, and a first shift output gear 34 integrally rotated with the first shift output shaft 33 and transmitting power to the forward idle gear unit 40.

That is, in the first shift output unit 30, the first shift output gear 34, the first shift low output gear 31, and the first shift high output gear 32 are integrally connected to and installed at the first shift output shaft 33, the first shift low output gear 31 is connected to be engaged with the first shift low gear 23 of the first shift input unit and the first shift high output gear 32 is connected to be engaged with the first shift high gear 25 of the first shift input unit, and the first shift output gear 34 is connected and installed to be engaged with the forward idle gear 41 of the forward idle gear unit.

In the first shift output unit 30 configured as described above, the first shift output shaft 33 is rotated upon receiving driving force from the first shift input unit 20 through the first shift low output gear 31 or the first shift high output gear 32, and the driving force from the first shift output shaft 33 is transmitted to the forward idle gear unit 40 through the first shift output gear 34.

The forward idle gear unit 40 is for switching an output direction by a rotational direction of an external power source, and as shown in FIGS. 1, 2, and 4, the forward idle gear unit 40 includes an idle gear shaft 42 and a forward idle gear 41 integrally rotated with the idle gear shaft 42 and engaged with the first shift output gear 34 and the second shift input gear 51. That is, the forward idle gear unit 40 is configured so that the driving force from the first shift output unit 30 is transmitted to the second shift input unit 50.

As shown in FIG. 1, the second shift input unit 50 includes a second shift input shaft 52, a second shift input gear 51 integrally rotated with the second shift input shaft 52 and engaged with the forward idle gear 41 of the forward idle gear unit 40, a second shift low gear 53 installed at the second shift input shaft 52 and supported by a second shift one-way bearing 54, a second shift middle clutch 56 connected to and installed at one end of the second shift input shaft 52, and a second shift middle gear 55 installed to be integrally rotated with the second shift input shaft 52 by a clutch operation of the second shift middle clutch 56.

That is, in the second shift input unit 50, the second shift input gear 51 is integrally connected to and installed at the second shift input shaft 52, the second shift low gear 53 is connected to and installed at the second shift input shaft 52 via the second shift one-way bearing 54, and the second shift middle gear 55 is connected to the second shift input shaft 52 so as to be integrally rotated with the second shift input shaft 52 by the second shift middle clutch 56. Here, the second shift one-way bearing 54 is installed such that a rotation driving force from the second shift input shaft 52 is transmitted to the second shift low gear 53 so that the second shift input shaft 52 and the second shift low gear 53 are integrally rotated when the power input unit 10 is driven in a forward direction (forward driving).

In the second shift input unit 50 configured as described above, in the case of a clutch release operation of the second shift middle clutch 56, a driving force from the forward idle gear unit 40 is transmitted to the second shift input shaft 52 through the second shift input gear 51 and a rotational force from the second shift input shaft 52 is transmitted to the second shift low gear 53 constrained (clutched) by the second shift one-way bearing 54, and in the case of a clutch operation of the second shift middle clutch 56, a driving force from the forward idle gear unit 40 is transmitted to the second shift input shaft 52 through the second shift input gear 51 and rotational force from the second shift input shaft 52 is transmitted to the second shift output unit through the second shift middle gear 55. Here, since the second shift low gear 53 is maintained in an idle state by the second shift one-way bearing 54, power is not transmitted to the second shift output unit 60 through the second shift low gear 53.

In addition, as shown in FIGS. 2 to 4 and 6, the second shift input unit 50 may further include a second shift high clutch 58 connected to one end of the second shift input shaft 52 and a second shift high gear 57 installed to be integrally rotated with the second shift input shaft 52 by an operation of the second shift high clutch 58.

In the second shift input unit 50 configured as described above, in the case of a clutch release operation of the second shift middle clutch 56 and the second shift high clutch 58, the driving force from the forward idle gear unit 40 is transmitted to the second shift input shaft 52 through the second shift input gear 51 and the rotational force from the second shift input shaft 52 is transmitted to the second shift output unit 60 through the second shift low gear 53 constrained (clutched) by the second shift one-way bearing 54.

In addition, in the case of a clutch operation of the second shift middle clutch 56 and a clutch release operation of the second shift high clutch, a driving force from the forward idle gear unit 40 is transmitted to the second shift middle gear 55 through the second shift input gear 51 and the second shift input shaft 52 and transmitted to the second shift output unit through the second shift middle gear 55.

In addition, in the case of a clutch release operation of the second shift middle clutch 56 and a clutch operation of the second shift high clutch, a driving force from the forward idle gear unit 40 is transmitted to the second shift high gear 57 through the second shift input gear 51 and the second shift input shaft 52 and is transmitted to the second shift output unit through the second shift high gear 57.

Here, the numbers of gear teeth of the second shift low gear 53, the second shift middle gear 55, and the second shift high gear 57 are determined in order of the second shift high gear 57>second shift middle gear 55>the second shift low gear 53.

As shown in FIGS. 1 to 4, the reverse input gear unit 80 includes a reverse gear input shaft 82, a reverse input gear 81 integrally rotated with the reverse gear input shaft 82 and engaged with the first shift reverse gear 27, and a reverse output gear 83 integrally rotated with the reverse gear input shaft 82 and connected to the second shift reverse output gear 66 of the second shift output unit.

That is, in the reverse input gear unit 80, the reverse input gear 81 and the reverse output gear 83 are integrally connected to and installed at the reverse gear input shaft 82, and the reverse input gear 81 and the reverse output gear 83 are connected and installed to be engaged with the first shift reverse gear 27 and the second shift reverse output gear 66, respectively.

In the reverse input gear unit 80 configured as described above, a rotational driving force from the first shift reverse gear 27 is transmitted to the reverse input gear 81, the reverse gear input shaft 82 is rotated by the rotation of the reverse input gear 81, and the reverse output gear 83 is rotated by the rotational driving of the reverse gear input shaft 82, so that the rotational driving force for reversing is transmitted to the second shift reverse output gear 66 of the second shift output unit 60.

As shown in FIGS. 1 to 4 and 6, the second shift output unit 60 includes a second shift output shaft 64, a second shift low output gear 61 integrally rotated with the second shift output shaft 64 and engaged with the second shift low gear 53, a second shift output gear integrally rotated with the second shift output shaft 64 and engaged with the second shift middle gear 55, and a second shift reverse output gear 66 integrally rotated with the second shift output shaft 64 and connected to the reverse output gear 83.

That is, in the second shift output unit 60, the second shift low output gear 61 and the second shift middle output gear 62 are integrally connected to and installed at the second shift output shaft 64, and the second shift low output gear 61 and the second shift middle output gear 62 are connected and installed so as to be engaged with the second shift low gear 53 and the second shift middle gear 55, respectively.

In addition, when the second shift high gear 57 and the second shift high clutch 58 are further provided in the second shift input unit 50, the second shift output unit 60 may further include a second shift high output gear 63 integrally rotated with the second shift output shaft 64 and engaged with the second shift high gear 57.

In the second shift output unit 60 configured as described above, the second shift output shaft 64 is rotated upon receiving a driving force from the second shift input unit 50 through the second shift low output gear 61, the second shift middle output gear 62, or the second shift high output gear 63.

In addition, as shown in FIG. 7, in the second shift output unit 60, the second shift middle output gear 62 may be installed to be connected by the output one-way bearing 67 with respect to the second shift output shaft 64, so that only one-directional rotation driving of the second shift middle output gear 62 may be transmitted to the second shift output shaft 64. That is, the output one-way bearing 67 is installed so that only the rotational force from the second shift middle output gear 62 is transmitted to the second shift output shaft 64 when power is input from an external power source in a forward direction.

In this manner, in the case where the second shift middle output gear 62 is connected to the second shift output shaft 64 by the output one-way bearing 67, when shifting is performed in the second shift middle clutch 56 according to an operation of the second shift high clutch 58, a shift delay and a decrease in torque due to a disconnection of the clutch may not occur and shock or rattling due to shifting may be reduced.

That is, in the present disclosure, after a clutch release operation of the second shift middle clutch 56, the second shift high clutch 58 may be clutched to perform shifting, but in a case where the second shift middle output gear 62 is connected and installed to be constrained at the second shift output shaft 64 by the output one-way bearing 67 with respect to a forward rotation (forward direction), shifting to a higher stage may be performed even if the second shift high clutch is clutched in a state in which the second shift middle clutch 56 is clutched.

As such, when the second shift middle clutch 56 and the second shift high clutch 58 are simultaneously clutched, a rotation speed of the second shift output shaft 64 integrally rotated with the second shift high output gear 63 is faster than a rotation speed of the second shift middle output gear 62, and thus, the second shift middle output gear 62 is idle due to a rotation difference by the output one-way bearing 67 and the rotation driving force from the second shift middle output gear 62 is not transmitted to the second shift output shaft 64. Therefore, when the second shift middle clutch 56 and the second shift high clutch 58 are simultaneously clutched, only the second shift output shaft 64 may be output by the second shift high output gear 63.

In addition, when the second shift high clutch 58 is released from a clutched state while the second shift middle clutch 56 and the second shift high clutch 58 are clutched at the same time, the second shift middle output gear 62 is rotated to output from the second shift output shaft 64 by a binding force of the output one-way bearing 67.

In the present disclosure, as shown in FIGS. 1 to 4, a differential gear assembly 70 may be further installed to be connected to the second shift output unit 60, and as such, the differential gear assembly 70 is further installed, a second shift output gear 65 may be further installed to be integrally rotated at the second shift output shaft 64 of the second shift output unit 60 and a driving force may be transmitted to the differential gear assembly 70 through the second shift output gear 65.

For example, a ring gear 71 of the differential gear assembly 70 may be coupled to the second shift output gear 65, so that a rotational driving force from the second shift output gear 65 may be transmitted to the differential gear assembly 70 through the ring gear 71. That is, the differential gear assembly 70 is configured so that the driving force is transmitted by the ring gear 71. Output of power by the differential gear assembly 70 is a known technique, and thus, a detailed description thereof is omitted.

In the present disclosure configured as described above, when power is input from an external power source in a forward direction and the reverse clutch 28, the first shift high clutch 26, and the second shift middle clutch 56, and the second shift high clutch 58 are released from a clutched state, the second shift output shaft 64 outputs with the highest gear ratio.

In addition, in the present disclosure, when power is input from an external power source in the forward direction and only the first shift high clutch 26 and the second shift high clutch 58 are operated to be clutched in a state in which the reverse clutch 28 and the second shift middle clutch 56 are released from a clutched state, the first shift input shaft 22 and the first shift high gear 25 are clutched by the first shift high clutch 26 so as to be integrally rotated and the second shift input shaft 52 and the second shift high gear 57 are clutched by the second shift high clutch 58 so as to be integrally rotated, so that the second shift output shaft 64 outputs with the lowest gear ratio.

In addition, in the present disclosure, in a state in which power is input from an external power source in the forward direction and the reverse clutch 28 and the first shift high clutch 26 are released from a clutched state, when the second shift middle clutch 56 or the second shift high clutch 58 is clutched, the second shift output shaft 64 may output with a gear ratio corresponding to between the highest gear ratio and the lowest gear ratio.

In addition, in the present disclosure, in a state in which power is input from an external power source in the forward direction and the first shift high clutch 26 is clutched, when the second shift middle clutch 56 is clutched or released from a clutched state or when the second shift high clutch 58 is clutched or released from a clutched state, the second shift output shaft may output with a gear ratio corresponding between the highest gear ratio and the lowest gear ratio or with the lowest gear ratio.

In addition, in the present disclosure, in a state in which power is input from an external power source in the reverse direction and the first shift high clutch 26, the second shift middle clutch 56, and the second shift high clutch 58 are released from a clutched state, when the reverse clutch 28 is clutched, the first shift input shaft 22 and the first shift reverse gear 27 are integrally rotated by the reverse clutch 28 and a rotational driving force from the first shift reverse gear 27 is transmitted to the second shift reverse output gear 66 through the reverse input gear 81 and the reverse output gear 83 of the reverse input gear unit 80, so that the second shift output shaft 64 is rotated.

Here, the second shift output shaft 64 is rotated in the reverse direction of a specific rotational direction (the rotational direction when power is input in the forward direction) and may output with a gear ratio higher than the highest gear ratio in the specific rotational direction (rotational direction when power is input in the forward direction).

As such, in the present disclosure, shifting (6-speed shifting) is performed with six gear ratios in the specific rotational direction (forward direction) as the first shift high clutch 26, the second shift middle clutch 56, the second shift high clutch 58, and the reverse clutch 28 are clutched or released from a clutched state, and shifting (1-speed reverse shifting) is performed in the opposite direction (reverse direction) with respect to the specific rotational direction.

The present disclosure configured as described above is applied to moving means such as two-wheeled, three-wheeled, or four-wheeled moving means driven by an electric motor or engine.

Hereinafter, the effects of the present disclosure will be described with reference to [Table 1] to [Table 7] based on the 6 forward and 1 reverse power transmission device shown in FIGS. 2 to 7. The numbers of teeth of the gears listed in [Table 1] to [Table 7] correspond to one example and the technical configuration of the present disclosure is not necessarily limited thereto.

TABLE 1

| No. | name | number of teeth | rotation direction | RPM | torque (Nm) | remark |
|---|---|---|---|---|---|---|
| first stage-Rated Speed ||||||| 
| 12a | input bevel gear | 20 | CCW | 2000 | 40.0 | |
| 12b | output bevel gear | 32 | CW | 1250 | 64.0 | |
| 15 | output gear | 56 | | | | |
| 21 | first shift input gear | 35 | CCW | 2000 | 40.0 | |
| 22 | first shift input shaft | — | | | | |
| 23 | first shift low gear | 55 | CCW | 2000 | 40.0 | clutch |
| 24 | first shift one-way bearing | — | CCW | 2000 | | |
| 25 | first shift high gear | 65 | CCW | 1385 | 57.8 | idling |
| 26 | first shift high clutch | — | CCW | 2000 | — | clutch release |
| 27 | first shift reverse gear(R) | 40 | CCW | 2063 | 38.8 | idling |
| 28 | reverse clutch(R) | — | — | — | — | clutch release |
| 31 | first shift low output gear | 55 | CW | 2000 | 40.0 | |
| 32 | first shift high output gear | 45 | | | | |
| 34 | first shift output gear | 33 | | | | |
| 41 | forward idle gear | 45 | CCW | 1467 | 54.5 | |
| 51 | second shift input gear | 66 | CW | 1000 | 80.0 | |
| 52 | second shift input shaft | — | | | | |
| 53 | second shift low gear | 55 | CW | 1000 | 80.0 | clutch |
| 54 | second shift one-way bearing | — | CW | 1000 | | |
| 55 | second shift middle gear | 70 | CW | 571 | 140.0 | idling |
| 56 | second shift middle clutch | — | — | 1000 | — | clutch release |
| 57 | second shift high gear | 75 | CW | 467 | 171.4 | idling |
| 58 | second shift high clutch | — | CW | 1000 | — | clutch release |
| 81 | reverse input gear(R) | 55 | CW | 1500 | 53.3 | |
| 83 | reverse output gear(R) | 40 | | | | |
| 61 | second shift low output gear | 55 | CCW | 1000 | 80.0 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 373 | 214.3 | 5.357 |
| — | input sprocket | 14 | | | | |
| — | output sprocket and wheel | 28 | CCW | 187 | 428.6 | 17.6 km/h |
| Ratio | | | | 10.714 | | |
| first stage-Max. Speed ||||||| 
| 12a | input bevel gear | 20 | CCW | 4000 | 25.0 | |
| 12b | output bevel gear | 32 | CW | 2500 | 40.0 | |
| 15 | output gear | 56 | | | | |
| 21 | first shift input gear | 35 | CCW | 4000 | 25.0 | |
| 22 | first shift input shaft | — | | | | |
| 23 | first shift low gear | 55 | CCW | 4000 | 25.0 | clutch |
| 24 | first shift one-way bearing | — | CCW | 4000 | | |
| 25 | first shift high gear | 65 | CCW | 2769 | 36.1 | idling |
| 26 | first shift high clutch | — | CCW | 4000 | — | clutch release |
| 27 | first shift reverse gear | 40 | CCW | 4125 | 24.2 | idling |
| 28 | first shift reverse gear clutch | — | — | — | — | clutch release |
| 31 | first shift low output gear | 55 | CW | 4000 | 25.0 | |
| 32 | first shift high output gear | 45 | | | | |
| 34 | first shift output gear | 33 | | | | |
| 41 | forward idle gear | 45 | CCW | 2933 | 34.1 | |
| 51 | second shift input gear | 66 | CW | 2000 | 50.0 | |
| 52 | second shift input shaft | — | | | | |
| 53 | second shift low gear | 55 | CW | 2000 | 50.0 | clutch |
| 54 | second shift one-way bearing | — | CW | 2000 | | |
| 55 | second shift middle gear | 70 | CW | 1143 | 87.5 | idling |
| 56 | second shift middle clutch | — | — | — | — | clutch release |
| 57 | second shift high gear | 75 | CW | 933 | 107.1 | idling |
| 58 | second shift high clutch | — | CW | 2000 | — | clutch release |
| 81 | reverse input gear(R) | 55 | CW | 3000 | 33.3 | |
| 83 | reverse output gear(R) | 40 | | | | |
| 61 | second shift low output gear | 55 | CCW | 2000 | 50.0 | |
| 62 | second shift middle output gear | 40 | | | | |
| 63 | second shift high output gear | 35 | | | | |

TABLE 1-continued

| No. | name | number of teeth | rotation direction | RPM | torque (Nm) | remark |
|---|---|---|---|---|---|---|
| 66 | second shift reverse output gear(R) | 60 | | | | |
| 65 | second shift output gear | 28 | | | | |
| 71 | ring gear (differential gear assembly) | 75 | CW | 747 | 133.9 | 5.357 |
| — | input sprocket | 14 | | | | |
| — | output sprocket and wheel | 28 | CCW | 373 | 267.9 | 35.2 km/h |
| | Ratio | | | 10.714 | | |

[Table 1] above shows an example of a forward first stage shift, and power is transmitted in the order of input bevel gear 12a→output bevel gear 12b→output gear 15→first shift input gear 21→first shift low gear 23→first shift low gear output gear 31→first shift output gear 34→forward idle gear 41→second shift input gear 51→second shift low gear 53→second shift low output gear 61→second shift output shaft 64→second shift output gear 65→differential gear assembly 70.

Here, the first shift low gear 23 is clutched (constrained) to the first shift input shaft 22 by the first shift one-way bearing 24 and rotated integrally, and the second shift low gear 53 is clutched (constrained) to the second shift input shaft 52 by the second shift one-way bearing 54 and rotated integrally.

In addition, the first shift high gear 25, the second shift middle gear 55, the second shift high gear 57, and the first shift reverse gear 27 are idle by the clutch release operation of the first shift high clutch 26, the second shift middle clutch 56, the second shift high clutch 58 and the reverse clutch 28 to make a forward first stage shift.

TABLE 2

| No. | name | number of teeth | rotation direction | RPM | torque (Nm) | remark |
|---|---|---|---|---|---|---|
| | second stage - Rated Speed | | | | | |
| 12a | input bevel gear | 20 | CCW | 2000 | 40.0 | |
| 12b | output bevel gear | 32 | CW | 1250 | 64.0 | |
| 15 | output gear | 56 | | | | |
| 21 | first shift input gear | 35 | CCW | 2000 | 40.0 | |
| 22 | first shift input shaft | — | | | | |
| 23 | first shift low gear | 55 | CCW | 2889 | 27.7 | rotation difference |
| 24 | first shift one-way bearing | — | CCW | 2000 | | idling |
| 25 | first shift high gear | 65 | CCW | 2000 | 40.0 | clutch |
| 26 | first shift high clutch | — | — | 2000 | | |
| 27 | first shift reverse gear(R) | 40 | CCW | 2979 | 26.9 | idling |
| 28 | reverse clutch(R) | — | — | — | — | clutch release |
| 31 | first shift low output gear | 55 | CW | 2889 | 27.7 | |
| 32 | first shift high output gear | 45 | | | | |
| 34 | first shift output gear | 33 | | | | |
| 41 | forward idle gear | 45 | CCW | 2119 | 37.8 | |
| 51 | second shift input gear | 66 | CW | 1444 | 55.4 | |
| 52 | second shift input shaft | — | | | | |
| 53 | second shift low gear | 55 | CW | 1444 | 55.4 | clutch |
| 54 | second shift one-way bearing | — | CW | 1444 | | |
| 55 | second shift middle gear | 70 | CW | 825 | 96.9 | idling |
| 56 | second shift middle clutch | — | — | — | — | clutch release |
| 57 | second shift high gear | 75 | CW | 674 | 118.7 | idling |
| 58 | second shift high clutch | — | — | — | — | clutch release |
| 81 | reverse input gear(R) | 55 | CW | 2167 | 36.9 | |
| 83 | reverse output gear(R) | 40 | | | | |
| 61 | second shift low output gear | 55 | CCW | 1444 | 55.4 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 539 | 148.4 | 3.709 |
| — | input sprocket | 14 | | | | |
| — | output sprocket and wheel | 28 | CCW | 270 | 296.7 | 25.4 km/h |
| Ratio | | | | 7.418 | | |
| | second stage - Max. Speed | | | | | |
| 12a | input bevel gear | 20 | CCW | 4000 | 25.0 | |
| 12b | output bevel gear | 32 | CW | 2500 | 40.0 | |
| 15 | output gear | 56 | | | | |
| 21 | first shift input gear | 35 | CCW | 4000 | 25.0 | |
| 22 | first shift input shaft | — | | | | |
| 23 | first shift low gear | 55 | CCW | 5778 | 17.3 | rotation difference |
| 24 | first shift one-way bearing | — | CCW | 4000 | | idling |
| 25 | first shift high gear | 65 | CCW | 4000 | 25.0 | clutch |
| 26 | first shift high clutch | — | — | 4000 | | |

TABLE 2-continued

| No. | name | number of teeth | rotation direction | RPM | torque (Nm) | remark |
|---|---|---|---|---|---|---|
| 27 | first shift reverse gear(R) | 40 | CCW | 5958 | 16.8 | idling |
| 28 | reverse clutch(R) | — | — | — | — | clutch release |
| 31 | first shift low output gear | 55 | CW | 5778 | 17.3 | |
| 32 | first shift high output gear | 45 | | | | |
| 34 | first shift output gear | 33 | | | | |
| 41 | forward idle gear | 45 | CCW | 4237 | 23.6 | |
| 51 | second shift input gear | 66 | CW | 2889 | 34.6 | |
| 52 | second shift input shaft | — | | | | |
| 53 | second shift low gear | 55 | CW | 2889 | 34.6 | clutch |
| 54 | second shift one-way bearing | — | CW | 2889 | | |
| 55 | second shift middle gear | 70 | CW | 1651 | 60.6 | idling |
| 56 | second shift middle clutch | — | — | — | — | clutch release |
| 57 | second shift high gear | 75 | CW | 1348 | 74.2 | idling |
| 58 | second shift high clutch | — | — | — | — | clutch release |
| 81 | reverse input gear(R) | 55 | CW | 4333 | 23.1 | |
| 83 | reverse output gear(R) | 40 | | | | |
| 61 | second shift low output gear | 55 | CCW | 2889 | 34.6 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 1079 | 92.7 | 3.709 |
| — | input sprocket | 14 | | | | |
| — | output sprocket and wheel | 28 | CCW | 539 | 185.4 | 50.8 km/h |
| Ratio | | | | | 7.418 | |

[Table 2] above shows an example of a forward second stage shift, and power is transmitted in the order of input bevel gear 12a→output bevel gear 12b→output gear 15→first shift input gear 21→first shift high gear 25 according to clutch of first shift high clutch 26→first shift high output 32→first shift output gear 34→forward idle gear 41→second shift input gear 51→second shift low gear 53→second shift low output gear 61→second shift output shaft 64→second shift output gear 65→differential gear assembly 70.

Here, the first shift low gear 23 is clutched (constrained) to the first shift input shaft 22 by the first shift one-way bearing 24 and rotated integrally, but since a rotation speed of the first shift low gear 23 based on the first shift low output gear 31 integrally rotated with the first shift high output gear 32 is greater than a rotation speed of the first shift input shaft 22, the first shift low gear 23 is idle due to a rotation difference.

In addition, the second shift low gear 53 is clutched (constrained) to the second shift input shaft 52 by the second shift one-way bearing 54 and rotated integrally.

In addition, the second shift middle gear 55, the second shift high gear 57, and the first shift reverse gear 27 are idle by the clutch release operation of the second shift middle clutch 56, the second shift high clutch 58, and the reverse clutch 28 to make a forward second stage shift.

TABLE 3

| No. | name | number of teeth | rotation direction | RPM | torque (Nm) | remark |
|---|---|---|---|---|---|---|
| | third stage - Rated Speed | | | | | |
| 12a | input bevel gear | 20 | CCW | 2000 | 40.0 | |
| 12b | output bevel gear | 32 | CW | 1250 | 64.0 | |
| 15 | output gear | 56 | | | | |
| 21 | first shift input gear | 35 | CCW | 2000 | 40.0 | |
| 22 | first shift input shaft | — | | | | |
| 23 | first shift low gear | 55 | CCW | 2000 | 40.0 | clutch |
| 24 | first shift one-way bearing | — | CCW | 2000 | | |
| 25 | first shift high gear | 65 | CCW | 1385 | 57.8 | idling |
| 26 | first shift high clutch | — | — | — | — | clutch release |
| 27 | first shift reverse gear(R) | 40 | CCW | 3609 | 22.2 | idling |
| 28 | reverse clutch(R) | — | — | — | — | clutch release |
| 31 | first shift low output gear | 55 | CW | 2000 | 40.0 | |
| 32 | first shift high output gear | 45 | | | | |
| 34 | first shift output gear | 33 | | | | |
| 41 | forward idle gear | 45 | CCW | 1467 | 54.5 | |
| 51 | second shift input gear | 66 | CW | 1000 | 80.0 | |
| 52 | second shift input shaft | — | | | | |
| 53 | second shift low gear | 55 | CW | 1750 | 45.7 | rotation difference idling |
| 54 | second shift one-way bearing | — | CW | 1000 | | |
| 55 | second shift middle gear | 70 | CW | 1000 | 80.0 | clutch |
| 56 | second shift middle clutch | — | CW | 1000 | | |
| 57 | second shift high gear | 75 | CW | 817 | 98.0 | idling |
| 58 | second shift high clutch | — | — | — | — | clutch release |
| 81 | reverse input gear(R) | 55 | CW | 2625 | 30.5 | |

TABLE 3-continued

| No. | name | number of teeth | rotation direction | RPM | torque (Nm) | remark |
|---|---|---|---|---|---|---|
| 83 | reverse output gear(R) | 40 | | | | |
| 61 | second shift low output gear | 55 | CCW | 1750 | 45.7 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 653 | 122.4 | 3.061 |
| — | input sprocket | 14 | | | | |
| — | output sprocket and wheel | 28 | CCW | 327 | 244.9 | 30.8 km/h |
| Ratio | | | | 6.122 | | |
| | | third stage - Max. Speed | | | | |
| 12a | input bevel gear | 20 | CCW | 4000 | 25.0 | |
| 12b | output bevel gear | 32 | CW | 2500 | 40.0 | |
| 15 | output gear | 56 | | | | |
| 21 | first shift input gear | 35 | CCW | 4000 | 25.0 | |
| 22 | first shift input shaft | — | | | | |
| 23 | first shift low gear | 55 | CCW | 4000 | 25.0 | clutch |
| 24 | first shift one-way bearing | — | CCW | 4000 | | |
| 25 | first shift high gear | 65 | CCW | 2769 | 36.1 | idling |
| 26 | first shift high clutch | — | — | — | — | clutch release |
| 27 | first shift reverse gear(R) | 40 | CCW | 7219 | 13.9 | idling |
| 28 | reverse clutch(R) | — | — | — | — | clutch release |
| 31 | first shift low output gear | 55 | CW | 4000 | 25.0 | |
| 32 | first shift high output gear | 45 | | | | |
| 34 | first shift output gear | 33 | | | | |
| 41 | forward idle gear | 45 | CCW | 2933 | 34.1 | |
| 51 | second shift input gear | 66 | CW | 2000 | 50.0 | |
| 52 | second shift input shaft | — | | | | |
| 53 | second shift low gear | 55 | CW | 3500 | 28.6 | rotation difference |
| 54 | second shift one-way bearing | — | CW | 2000 | | idling |
| 55 | second shift middle gear | 70 | CW | 2000 | 50.0 | clutch |
| 56 | second shift middle clutch | — | CW | 2000 | | |
| 57 | second shift high gear | 75 | CW | 1633 | 61.2 | idling |
| 58 | second shift high clutch | — | — | — | — | clutch release |
| 81 | reverse input gear(R) | 55 | CW | 5250 | 19.0 | |
| 83 | reverse output gear(R) | 40 | | | | |
| 61 | second shift low output gear | 55 | CCW | 3500 | 28.6 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 1307 | 76.5 | 3.061 |
| — | input sprocket | 14 | | | | |
| — | output sprocket and wheel | 28 | CCW | 653 | 153.1 | 61.6 km/h |
| Ratio | | | | 6.122 | | |

[Table 3] above shows an example of a forward third stage shift, and power is transmitted in the order of input bevel gear 12a→output bevel gear 12b→output gear 15→first shift input gear 21→first shift low gear 23→first shift low gear output gear 31→first shift output gear 34→forward idle gear 41→second shift input gear 51→second shift middle gear 55 according to clutch of second shift middle clutch→second shift middle output gear 62→second shift output shaft 64→second shift output gear 65→differential gear assembly 70.

Here, the second shift low gear 53 is clutched (constrained) to the second shift input shaft 52 by the second shift one-way bearing 54 and rotated integrally, but since a rotation speed of the second shift low gear 53 by the second shift low output gear 61 rotated integrally with the second shift middle output gear 62 is greater than a rotation speed of the second shift input shaft 52, the second shift low gear 53 is idle due to a rotation difference.

In addition, the first shift low gear 23 is clutched (constrained) to the first shift input shaft 22 by the first shift one-way bearing 24 and rotated integrally.

mow In addition, the first shift high gear 25, the second shift high gear 57, and the first shift reverse gear 27 are idle by the clutch release operation of the first shift high clutch 26, the second shift high clutch 58, and the reverse clutch 28 to make a forward third stage shift.

TABLE 4

| No. | name | number of teeth | rotation direction | RPM | torque (Nm) | remark |
|---|---|---|---|---|---|---|
| | | fourth stage - Rated Speed | | | | |
| 12a | input bevel gear | 20 | CCW | 2000 | 40.0 | |
| 12b | output bevel gear | 32 | CW | 1250 | 64.0 | |

TABLE 4-continued

| No. | name | number of teeth | rotation direction | RPM | torque (Nm) | remark |
|---|---|---|---|---|---|---|
| 15 | output gear | 56 | | | | |
| 21 | first shift input gear | 35 | CCW | 2000 | 40.0 | |
| 22 | first shift input shaft | — | | | | |
| 23 | first shift low gear | 55 | CCW | 2000 | 40.0 | clutch |
| 24 | first shift one-way bearing | — | CCW | 2000 | | |
| 25 | first shift high gear | 65 | CCW | 1385 | 57.8 | idling |
| 26 | first shift high clutch | — | — | — | — | clutch release |
| 27 | first shift reverse gear(R) | 40 | CCW | 4420 | 18.1 | idling |
| 28 | reverse clutch(R) | — | — | — | — | clutch release |
| 31 | first shift low output gear | 55 | CW | 2000 | 40.0 | |
| 32 | first shift high output gear | 45 | | | | |
| 34 | first shift output gear | 33 | | | | |
| 41 | forward idle gear | 45 | CCW | 1467 | 54.5 | |
| 51 | second shift input gear | 66 | CW | 1000 | 80.0 | |
| 52 | second shift input shaft | — | | | | |
| 53 | second shift low gear | 55 | CW | 2143 | 37.3 | rotation difference |
| 54 | second shift one-way bearing | — | CW | 1000 | | idling |
| 55 | second shift middle gear | 70 | CW | 1224 | 65.3 | idling |
| 56 | second shift middle clutch | — | — | — | — | clutch release |
| 57 | second shift high gear | 75 | CW | 1000 | 80.0 | clutch |
| 58 | second shift high clutch | — | CW | 1000 | | clutch release |
| 81 | reverse input gear(R) | 55 | CW | 3214 | 24.9 | |
| 83 | reverse output gear(R) | 40 | | | | |
| 61 | second shift low output gear | 55 | CCW | 2143 | 37.3 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 800 | 100.0 | 2.500 |
| — | input sprocket | 14 | | | | |
| — | output sprocket and wheel | 28 | CCW | 400 | 200.0 | 37.7 km/h |
| Ratio | | | | 5.000 | | |
| fourth stage - Max. Speed | | | | | | |
| 12a | input bevel gear | 20 | CCW | 4000 | 25.0 | |
| 12b | output bevel gear | 32 | CW | 2500 | 40.0 | |
| 15 | output gear | 56 | | | | |
| 21 | first shift input gear | 35 | CCW | 4000 | 25.0 | |
| 22 | first shift input shaft | — | | | | |
| 23 | first shift low gear | 55 | CCW | 4000 | 25.0 | clutch |
| 24 | first shift one-way bearing | — | CCW | 4000 | | |
| 25 | first shift high gear | 65 | CCW | 2769 | 36.1 | idling |
| 26 | first shift high clutch | — | — | — | — | clutch release |
| 27 | first shift reverse gear(R) | 40 | CCW | 8839 | 11.3 | idling |
| 28 | reverse clutch(R) | — | — | — | — | clutch release |
| 31 | first shift low output gear | 55 | CW | 4000 | 25.0 | |
| 32 | first shift high output gear | 45 | | | | |
| 34 | first shift output gear | 33 | | | | |
| 41 | forward idle gear | 45 | CCW | 2933 | 34.1 | |
| 51 | second shift input gear | 66 | CW | 2000 | 50.0 | |
| 52 | second shift input shaft | — | | | | |
| 53 | second shift low gear | 55 | CW | 4286 | 23.3 | rotation difference |
| 54 | second shift one-way bearing | — | CW | 2000 | | idling |
| 55 | second shift middle gear | 70 | CW | 2449 | 40.8 | idling |
| 56 | second shift middle clutch | — | — | — | — | clutch release |
| 57 | second shift high gear | 75 | CW | 2000 | 50.0 | clutch |
| 58 | second shift high clutch | — | CW | 2000 | | |
| 81 | reverse input gear(R) | 55 | CW | 6429 | 15.6 | |
| 83 | reverse output gear(R) | 40 | | | | |
| 61 | second shift low output gear | 55 | CCW | 4286 | 23.3 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 1600 | 62.5 | 2.500 |
| — | input sprocket | 14 | | | | |
| — | output sprocket and wheel | 28 | CCW | 800 | 125.0 | 75.4 km/h |
| Ratio | | | | 5.000 | | |

[Table 4] above shows an example of a forward fourth stage shift, and power is transmitted in the order of input bevel gear 12a→output bevel gear 12b→output gear 15→first shift input gear 21→first shift low gear 23→first shift low gear output gear 31→first shift output gear 34→forward idle gear 41→second shift input gear 51→second shift high gear 57 according to clutch of second shift high clutch 58→second shift high output gear 63→second shift output shaft 64→second shift output gear 65→differential gear assembly 70.

Here, the second shift low gear 53 is clutched (constrained) to the second shift input shaft 52 by the second shift one-way bearing 54 and rotated integrally, but since a rotation speed of the second shift low gear 53 by the second shift low output gear 61 rotated integrally with the second shift high output gear 63 is greater than a rotation speed of the second shift input shaft 52, the second shift low gear 53 is idle due to a rotation difference.

In addition, the first shift low gear 23 is clutched (constrained) to the first shift input shaft 22 by the first shift one-way bearing 24 and rotated integrally.

In addition, the first shift high gear 25, the second shift middle gear 55, and the first shift reverse gear 27 are idle by the clutch release operation of the first shift high clutch 26, the second shift middle clutch 56, and the reverse clutch 28 to make a forward fourth stage shift.

TABLE 5

| No. | name | number of teeth | rotation direction | RPM | torque (Nm) | remark |
|---|---|---|---|---|---|---|
| | | | fifth stage - Rated Speed | | | |
| 12a | input bevel gear | 20 | CCW | 2000 | 40.0 | |
| 12b | output bevel gear | 32 | CW | 1250 | 64.0 | |
| 15 | output gear | 56 | | | | |
| 21 | first shift input gear | 35 | CCW | 2000 | 40.0 | |
| 22 | first shift input shaft | — | | | | |
| 23 | first shift low gear | 55 | CCW | 2889 | 27.7 | rotation difference |
| 24 | first shift one-way bearing | — | CCW | 2000 | | idling |
| 25 | first shift high gear | 65 | CCW | 2000 | 40.0 | clutch |
| 26 | first shift high clutch | — | — | 2000 | | |
| 27 | first shift reverse gear(R) | 40 | CCW | 4420 | 15.3 | idling |
| 28 | reverse clutch(R) | — | CCW | 2000 | — | clutch release |
| 31 | first shift low output gear | 55 | CW | 2889 | 27.7 | |
| 32 | first shift high output gear | 45 | | | | |
| 34 | first shift output gear | 33 | | | | |
| 41 | forward idle gear | 45 | CCW | 2119 | 37.8 | |
| 51 | second shift input gear | 66 | CW | 1444 | 55.4 | |
| 52 | second shift input shaft | — | | | | |
| 53 | second shift low gear | 55 | CW | 2528 | 31.6 | rotation difference |
| 54 | second shift one-way bearing | — | CW | 1444 | | idling |
| 55 | second shift middle gear | 70 | CW | 1444 | 55.4 | clutch |
| 56 | second shift middle clutch | — | CW | 1444 | | |
| 57 | second shift high gear | 75 | CW | 1180 | 67.8 | idling |
| 58 | second shift high clutch | — | CW | 1444 | — | clutch release |
| 81 | reverse input gear(R) | 55 | CW | 3792 | 21.1 | |
| 83 | reverse output gear(R) | 40 | | | | |
| 61 | second shift low output gear | 55 | CCW | 2528 | 31.6 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 944 | 84.8 | 2.119 |
| — | input sprocket | 14 | | | | |
| — | output sprocket and wheel | 28 | CCW | 472 | 169.5 | 44.5 km/h |
| Ratio | | | | 4.239 | | |
| | | | fifth stage - Max. Speed | | | |
| 12a | input bevel gear | 20 | CCW | 4000 | 25.0 | |
| 12b | output bevel gear | 32 | CW | 2500 | 40.0 | |
| 15 | output gear | 56 | | | | |
| 21 | first shift input gear | 35 | CCW | 4000 | 25.0 | |
| 22 | first shift input shaft | — | | | | |
| 23 | first shift low gear | 55 | CCW | 5778 | 17.3 | rotation difference |
| 24 | first shift one-way bearing | — | CCW | 4000 | | idling |
| 25 | first shift high gear | 65 | CCW | 4000 | 25.0 | clutch |
| 26 | first shift high clutch | — | — | 4000 | | |
| 27 | first shift reverse gear(R) | 40 | CCW | 10427 | 9.6 | idling |
| 28 | reverse clutch(R) | — | CCW | 4000 | — | clutch release |
| 31 | first shift low output gear | 55 | CW | 5778 | 17.3 | |
| 32 | first shift high output gear | 45 | | | | |
| 34 | first shift output gear | 33 | | | | |
| 41 | forward idle gear | 45 | CCW | 4237 | 23.6 | |
| 51 | second shift input gear | 66 | CW | 2889 | 34.6 | |
| 52 | second shift input shaft | — | | | | |
| 53 | second shift low gear | 55 | CW | 5056 | 19.8 | rotation difference |
| 54 | second shift one-way bearing | — | CW | 289 | | idling |
| 55 | second shift middle gear | 70 | CW | 2889 | 34.6 | clutch |
| 56 | second shift middle clutch | — | — | 2889 | | |

TABLE 5-continued

| No. | name | number of teeth | rotation direction | RPM | torque (Nm) | remark |
|---|---|---|---|---|---|---|
| 57 | second shift high gear | 75 | CW | 2359 | 42.4 | idling |
| 58 | second shift high clutch | — | CW | 2889 | — | clutch release |
| 81 | reverse input gear(R) | 55 | CW | 7583 | 13.2 | |
| 83 | reverse output gear(R) | 40 | | | | |
| 61 | second shift low output gear | 55 | CCW | 5056 | 19.8 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 1887 | 53.0 | 2.119 |
| — | input sprocket | 14 | | | | |
| — | output sprocket and wheel | 28 | CCW | 944 | 106.0 | 88.9 km/h |
| Ratio | | | | 4.239 | | |

[Table 5] above shows an example of a forward fifth stage shift, and power is transmitted in the order of input bevel gear 12*a*→output bevel gear 12*b*→output gear 15→first shift input gear 21→first shift high gear 25 according to clutch operation of first shift high clutch 26→first shift high output gear 32→first shift output gear 34→forward idle gear 41→second shift input gear 51→second shift middle gear 55 according to clutch operation of second shift middle clutch 56→second shift middle output gear 62→second shift output shaft 64→second shift output gear 65→differential gear assembly 70.

Here, the first shift low gear 23 is clutched (constrained) to the first shift input shaft 22 by the first shift one-way bearing 24 and rotated integrally, but since a rotation speed of the first shift low gear 23 by the first shift low output gear 31 rotated integrally with the first shift high output gear 32 is greater than a rotation speed of the first shift input shaft 22, the first shift low gear 23 is idle due to a rotation difference.

In addition, the second shift low gear 53 is also clutched (constrained) to the second shift input shaft 52 by the second shift one-way bearing 54 and rotated integrally, but since a rotation speed of the second shift low gear 53 by the second shift low output gear 61 rotated integrally with the second shift middle output gear 62 is greater than a rotation speed of the second shift input shaft 52, the second shift low gear 53 is idle due to a rotation difference.

In addition, the second shift high gear 57 and the first shift reverse gear 27 are idle by the clutch release operation of the second shift high clutch 58 and the reverse clutch 28 to make a forward fifth stage shift.

TABLE 6

| No. | name | number of teeth | rotation direction | RPM | torque (Nm) | remark |
|---|---|---|---|---|---|---|
| | sixth stage - Rated Speed | | | | | |
| 12a | input bevel gear | 20 | CCW | 2000 | 40.0 | |
| 12b | output bevel gear | 32 | CW | 1250 | 64.0 | |
| 15 | output gear | 56 | | | | |
| 21 | first shift input gear | 35 | CCW | 2000 | 40.0 | |
| 22 | first shift input shaft | — | | | | |
| 23 | first shift low gear | 55 | CCW | 2889 | 27.7 | rotation difference |
| 24 | first shift one-way bearing | — | CCW | 2000 | | idling |
| 25 | first shift high gear | 65 | CCW | 2000 | 40.0 | clutch |
| 26 | first shift high clutch | — | — | 2000 | | |
| 27 | first shift reverse gear(R) | 40 | CCW | 6384 | 12.5 | idling |
| 28 | reverse clutch(R) | — | CCW | 2000 | — | clutch release |
| 31 | first shift low output gear | 55 | CW | 2889 | 27.7 | |
| 32 | first shift high output gear | 45 | | | | |
| 34 | first shift output gear | 33 | | | | |
| 41 | forward idle gear | 45 | CCW | 2119 | 37.8 | |
| 51 | second shift input gear | 66 | CW | 1444 | 55.4 | |
| 52 | second shift input shaft | — | | | | |
| 53 | second shift low gear | 55 | CW | 3095 | 25.8 | rotation difference |
| 54 | second shift one-way bearing | — | CW | 1444 | | idling |
| 55 | second shift middle gear | 70 | CW | 1769 | 45.2 | idling |
| 56 | second shift middle clutch | — | CW | 1444 | — | clutch release |
| 57 | second shift high gear | 75 | CW | 1444 | 55.4 | clutch |
| 58 | second shift high clutch | — | CW | 1444 | | |
| 81 | reverse input gear(R) | 55 | CW | 4643 | 17.2 | |
| 83 | reverse output gear(R) | 40 | | | | |
| 61 | second shift low output gear | 55 | CCW | 3095 | 25.8 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 11156 | 69.2 | 1.731 |

TABLE 6-continued

| No. | name | number of teeth | rotation direction | RPM | torque (Nm) | remark |
|---|---|---|---|---|---|---|
| — | input sprocket | 14 | | | | |
| — | output sprocket and wheel | 28 | CCW | 578 | 138.5 | 54.5 km/h |
| Ratio | | | | 3.462 | | |
| | sixth stage - Max. Speed | | | | | |
| 12a | input bevel gear | 20 | CCW | 4000 | 25.0 | Max. RPM |
| 12b | output bevel gear | 32 | CW | 2500 | 40.0 | |
| 15 | output gear | 56 | | | | |
| 21 | first shift input gear | 35 | CCW | 4000 | 25.0 | |
| 22 | first shift input shaft | — | | | | |
| 23 | first shift low gear | 55 | CCW | 5778 | 17.3 | rotation difference |
| 24 | first shift one-way bearing | — | CCW | 4000 | | idling |
| 25 | first shift high gear | 65 | CCW | 4000 | 25.0 | clutch |
| 26 | first shift high clutch | — | — | 4000 | | |
| 27 | first shift reverse gear(R) | 40 | CCW | 12768 | 7.8 | idling |
| 28 | reverse clutch(R) | — | CCW | 4000 | — | clutch release |
| 31 | first shift low output gear | 55 | CW | 5778 | 17.3 | |
| 32 | first shift high output gear | 45 | | | | |
| 34 | first shift output gear | 33 | | | | |
| 41 | forward idle gear | 45 | CCW | 4237 | 23.6 | |
| 51 | second shift input gear | 66 | CW | 2889 | 34.6 | |
| 52 | second shift input shaft | — | | | | |
| 53 | second shift low gear | 55 | CW | 6190 | 16.2 | rotation difference |
| 54 | second shift one-way bearing | — | CW | 2889 | | idling |
| 55 | second shift middle gear | 70 | CW | 3537 | 28.3 | idling |
| 56 | second shift middle clutch | — | CW | 2889 | — | clutch release |
| 57 | second shift high gear | 75 | CW | 2889 | 34.6 | clutch |
| 58 | second shift high clutch | — | CW | 2889 | | |
| 81 | reverse input gear(R) | 55 | CW | 9286 | 10.8 | |
| 83 | reverse output gear(R) | 40 | | | | |
| 61 | second shift low output gear | 55 | CCW | 6190 | 16.2 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 2311 | 43.3 | 1.731 |
| — | input sprocket | 14 | | | | |
| — | output sprocket and wheel | 28 | CCW | 1156 | 86.5 | 108.9 km/h |
| Ratio | | | | 3.462 | | |

[Table 6] above shows an example of a forward sixth stage shift, and power is transmitted in the order of input bevel gear 12a→output bevel gear 12b→output gear 15→first shift input gear 21→first shift high gear 25 according to clutch operation of first shift high clutch 26→first shift high output gear 32→first shift output gear 34→forward idle gear 41→second shift input gear 51→second shift high gear 57 according to clutch operation of second shift high clutch 58→second shift high output gear 63→second shift output shaft 64→second shift output gear 65→differential gear assembly 70.

Here, the first shift low gear 23 is clutched (constrained) to the first shift input shaft 22 by the first shift one-way bearing 24 and rotated integrally, but since a rotation speed of the first shift low gear 23 by the first shift low output gear 31 rotated integrally with the first shift high output gear 32 is greater than a rotation speed of the first shift input shaft 22, the first shift low gear 23 is idle due to a rotation difference.

In addition, the second shift low gear 53 is also clutched (constrained) to the second shift input shaft 52 by the second shift one-way bearing 54 and rotated integrally, but since a rotation speed of the second shift low gear 53 by the second shift low output gear 61 rotated integrally with the second shift high output gear 63 is greater than a rotation speed of the second shift input shaft 52, the second shift low gear 53 is idle due to a rotation difference.

In addition, the second shift middle gear 55 and the first shift reverse gear 27 are idle by the clutch release operation of the second shift middle clutch 56 and the reverse clutch 28 to make a forward sixth stage shift.

TABLE 7

| No. | name | number of teeth | rotation direction | RPM | torque (Nm) | remark |
|---|---|---|---|---|---|---|
| | reverse - Rated Speed | | | | | |
| 12a | input bevel gear | 20 | CW | 2000 | 40.0 | |
| 12b | output bevel gear | 32 | CCW | 1250 | 64.0 | |
| 15 | output gear | 56 | | | | |
| 21 | first shift input gear | 35 | CW | 2000 | 40.0 | |
| 22 | first shift input shaft | — | | | | |
| 23 | first shift low gear | 55 | CW | 1939 | 41.3 | inverse rotation |
| 24 | first shift one-way bearing | — | CW | 2000 | | difference idling |

TABLE 7-continued

| No. | name | number of teeth | rotation direction | RPM | torque (Nm) | remark |
|---|---|---|---|---|---|---|
| 25 | first shift high gear | 65 | CW | 1343 | 59.6 | idling |
| 26 | first shift high clutch | — | — | — | — | clutch release |
| 27 | first shift reverse gear(R) | 40 | CW | 2000 | 40.0 | |
| 28 | reverse clutch(R) | — | — | 2000 | | clutch |
| 31 | first shift low output gear | 55 | CCW | 1939 | 41.3 | |
| 32 | first shift high output gear | 45 | | | | |
| 34 | first shift output gear | 33 | | | | |
| 41 | forward idle gear | 45 | CW | 1422 | 56.3 | |
| 51 | second shift input gear | 66 | CCW | 970 | 82.5 | |
| 52 | second shift input shaft | — | | | | |
| 53 | second shift low gear | 55 | CCW | 970 | 82.5 | inverse rotation |
| 54 | second shift one-way bearing | — | CCW | 970 | | difference idling |
| 55 | second shift middle gear | 70 | CCW | 554 | 144.4 | idling |
| 56 | second shift middle clutch | — | — | — | — | clutch release |
| 57 | second shift high gear | 75 | CCW | 453 | 176.8 | idling |
| 58 | second shift high clutch | — | — | — | — | clutch release |
| 81 | reverse input gear(R) | 55 | CCW | 1455 | 55.0 | |
| 83 | reverse output gear(R) | 40 | CCW | | | |
| 61 | second shift low output gear | 55 | CW | 970 | 82.5 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 362 | 221.0 | 5.525 |
| — | input sprocket | 14 | | | | |
| — | output sprocket and wheel | 28 | CCW | 181 | 442.0 | 17.1 km/h |
| Ratio | | | | 11.049 | | |
| reverse - Max. Speed | | | | | | |
| 12a | input bevel gear | 20 | CW | 4000 | 25.0 | |
| 12b | output bevel gear | 32 | CCW | 2500 | 40.0 | |
| 15 | output gear | 56 | | | | |
| 21 | first shift input gear | 35 | CW | 4000 | 25.0 | |
| 22 | first shift input shaft | — | | | | |
| 23 | first shift low gear | 55 | CW | 3879 | 25.8 | inverse rotation |
| 24 | first shift one-way bearing | — | CW | 4000 | | difference idling |
| 25 | first shift high gear | 65 | CW | 2685 | 37.2 | idling |
| 26 | first shift high clutch | — | — | — | — | clutch release |
| 27 | first shift reverse gear(R) | 40 | CW | 4000 | 25.0 | |
| 28 | reverse clutch(R) | — | — | 4000 | | clutch |
| 31 | first shift low output gear | 55 | CCW | 3879 | 25.8 | |
| 32 | first shift high output gear | 45 | | | | |
| 34 | first shift output gear | 33 | | | | |
| 41 | forward idle gear | 45 | CW | 2844 | 35.2 | |
| 51 | second shift input gear | 66 | CCW | 1939 | 51.6 | |
| 52 | second shift input shaft | — | | | | |
| 53 | second shift low gear | 55 | CCW | 1939 | 51.6 | inverse rotation |
| 54 | second shift one-way bearing | — | CCW | 1939 | | difference idling |
| 55 | second shift middle gear | 70 | CCW | 1108 | 90.2 | idling |
| 56 | second shift middle clutch | — | — | — | — | clutch release |
| 57 | second shift high gear | 75 | CCW | 905 | 110.5 | idling |
| 58 | second shift high clutch | — | — | — | — | clutch release |
| 81 | reverse input gear(R) | 55 | CCW | 2909 | 34.4 | |
| 83 | reverse output gear(R) | 40 | CCW | | | |
| 61 | second shift low output gear | 55 | CW | 1939 | 51.6 | |
| 62 | second shift middle output gear | 40 | | | | |
| 63 | second shift high output gear | 35 | | | | |
| 66 | second shift reverse output gear(R) | 60 | | | | |
| 65 | second shift output gear | 28 | | | | |
| 71 | ring gear (differential gear assembly) | 75 | CW | 724 | 138.1 | 5.525 |
| — | input sprocket | 14 | | | | |
| — | output sprocket and wheel | 28 | CCW | 362 | 276.2 | 108.9 km/h |
| Ratio | | | | 11.049 | | |

[Table 7] shows an example of a reverse first stage shift and power (reverse driving force) is transmitted in the order of input bevel gear 12a→output bevel gear 12b→output gear 15→first shift input gear 21→first shift reverse gear 27 according to clutch operation of reverse clutch 28→reverse input gear 81→reverse output gear 83→second shift reverse output gear 66→second shift output shaft 64→second shift output gear 65→differential gear assembly 70.

Here, the first shift low gear 23 and the second shift low gear 53 are maintained in an idle state due to an inverse rotation difference of the first shift input shaft and the first shift high gear 25, the second shift middle gear 55, and the second shift high gear 57 are idle by a clutch release operation of the first shift high clutch 26, the second shift middle clutch 56, and the second shift high clutch 58 to make a reverse first stage shift.

The present disclosure is not limited to the specific embodiments described above, and any person skilled in the art to which the disclosure pertains may implement various modifications without departing from the gist of the present disclosure as claimed in the claims and such modifications are within the scope of the claims.

The power transmission device of the present disclosure allows forward or reverse shifting to be made quickly and smoothly according to a clutch operation by combining a first shift input unit, a first shift output unit, a reverse input gear unit, a second shift input unit, a forward idle gear unit, and a second shift output unit.

In addition, the power transmission device of the present disclosure is provided so that power transmission for forward and reverse movement is performed quickly and smoothly, thereby minimizing an occurrence of noise and shock due to shifting, improving shift quality, and improving space utilization of an engine compartment of a moving means, or the like, and thus being used for industrial purposes.

What is claimed is:

1. A power transmission device comprising:
a first shift input unit in which a first shift low gear is connected to and installed at a first shift input shaft so as to be constrained by a first shift one-way bearing in one direction, a first shift input gear receiving a driving force from a power generating unit is integrally installed at the first shift input shaft, and a reverse clutch for clutching a first shift reverse gear to the first shift input shaft and a first shift high clutch for clutching a first shift high gear to the first shift input shaft are connected to and installed at both ends of the first shift input shaft;
a first shift output unit connected and installed so that a driving force from the first shift low gear or the first shift high gear of the first shift input unit is transmitted thereto;
a reverse input gear unit connected and installed so that a reverse driving force from the first shift reverse gear of the first shift input unit is transmitted thereto;
a second shift input unit in which a second shift input gear receiving a driving force from the first shift output unit is integrally installed at the second shift input shaft, a second shift low gear is connected to the second shift input shaft so as to be constrained by a second shift one-way bearing in one direction, and a second shift middle clutch clutching a second shift middle gear to the second shift input shaft is connected to one end of the second shift input shaft;
a forward idle gear unit connected to and installed at the first shift output unit and the second shift input unit so that a driving force from the first shift output unit is transmitted to the second shift input unit; and
a second shift output unit connected and installed so that a reverse driving force by the reverse input gear unit and a forward driving force by the second shift input unit are transmitted thereto, to perform a forward or reverse output,
wherein shifting of four (4) forward speeds is selectively performed according to whether the first shift high clutch and the second shift middle clutch perform clutching, and shifting of one (1) reverse speed is performed according to an operation of the reverse clutch.

2. The power transmission device of claim 1, wherein the first and second shift low gears are connected to and installed at the first and second shift input shafts by the first and second shift one-way bearings, respectively, so that a rotational force from the first and second shift input shafts are transmitted thereto when a power input unit is driven in a forward direction.

3. The power transmission device of claim 1, wherein the first shift input unit includes:
the first shift input shaft;
the first shift input gear integrally rotated at the first shift input shaft and engaged with an output gear of the power input unit;
the first shift low gear installed at the first shift input shaft to be supported by the first shift one-way bearing;
the reverse clutch connected to and installed at one end of the first shift input shaft;
the first shift reverse gear installed to be rotated integrally with the first shift input shaft by an operation of the reverse clutch;
the first shift high clutch connected to and installed at the other end of the first shift input shaft; and
the first shift high gear installed to be integrally rotated with the first shift input shaft by an operation of the first shift high clutch.

4. The power transmission device of claim 1, wherein the first shift low gear has the number of gear teeth less than that of the first shift high gear.

5. The power transmission device of claim 1, wherein the first shift output unit includes:
a first shift output shaft;
a first shift low output gear integrally rotated at the first shift output shaft and engaged with the first shift low gear;
a first shift high output gear integrally rotated at the first shift output shaft and engaged with the first shift high gear; and
a first shift output gear rotated at the first shift output shaft and transmitting power to the forward idle gear unit.

6. The power transmission device of claim 1, wherein the second shift input unit includes:
the second shift input shaft;
the second shift input gear integrally rotated at the second shift input shaft and engaged with a forward idle gear of the forward idle gear unit;
the second shift low gear installed at the second shift input shaft so as to be supported by the second shift one-way bearing;
the second shift middle clutch connected to and installed at the other end of the second shift input shaft; and
the second shift middle gear installed to be integrally rotated with the second shift input shaft by an operation of the second shift middle clutch.

7. The power transmission device of claim 1, wherein the second shift low gear has the number of teeth less than that of the second shift middle gear.

8. The power transmission device of claim 1, wherein the reverse input gear unit includes:
a reverse gear input shaft;
a reverse input gear integrally rotated at the reverse gear input shaft and engaged with the first shift reverse gear; and
a reverse output gear integrally rotated with the reverse gear input shaft and connected to the second shift reverse output gear of the second shift output unit,
wherein the forward idle gear unit includes an idle gear shaft and a forward idle gear integrally rotated at the idle gear shaft and engaged with the first shift output gear and the second shift input gear.

9. The power transmission device of claim 1, further comprising:
- a second shift low output gear integrally rotated at the second shift output shaft and engaged with the second shift low gear;
- a second shift middle output gear integrally rotated at the second shift output shaft and engaged with the second shift middle gear; and
- a second shift reverse output gear integrally rotated at the second shift output shaft and connected to the reverse output gear.

10. The power transmission device of claim 1, wherein the second shift input unit includes:
the second shift input shaft;
the second shift input gear integrally rotated at the second shift input shaft and engaged with the forward idle gear of the forward idle gear unit;
the second shift low gear installed at the second shift input shaft so as to be supported by the second shift one-way bearing;
a second shift high clutch connected to and installed at one end of the second shift input shaft;
a second shift high gear installed to be integrally rotated with the second shift input shaft by an operation of the second shift high clutch;
the second shift middle clutch connected to and installed at the other end of the second shift input shaft; and
the second shift middle gear installed to be integrally rotated with the second shift input shaft by an operation of the second shift middle clutch,
wherein
the second shift output unit includes:
a second shift output shaft;
a second shift low output gear integrally rotated at the second shift output shaft and engaged with the second shift low gear;
a second high output gear integrally rotated at the second shift output shaft and engaged with the second shift high gear;
a second shift middle output gear integrally rotated at the second shift output shaft and engaged with the second shift middle gear; and
a second shift reverse output gear integrally rotated at the second shift output shaft and connected to the reverse output gear.

11. The power transmission device of claim 10, wherein
The numbers of gear teeth of the second shift low gear, the second shift middle gear, and the second shift high gear are in order of the second shift high gear >the second shift middle gear >the second shift low gear.

12. The power transmission device of claim 10, wherein
the second shift output unit is installed so that the second shift middle output gear and the second shift output shaft are connected by an output one-way bearing, and
the output one-way bearing is installed so that a rotational force from the second shift middle output gear is transmitted to the second shift output shaft when power from an external power source is input in a forward direction.

13. The power transmission device of claim 1, wherein
a differential gear assembly is further installed so as to be connected to the second shift output unit,
the second shift output unit is installed so that the second shift output gear is integrally rotated at the second shift output shaft, and
a ring gear of the differential gear assembly is coupled to the second shift output gear so that a driving force from the second shift output unit is transmitted to the differential gear assembly.

\* \* \* \* \*